CERAMIC SUPPORTED SLOW WAVE CIRCUITS WITH THE CERAMIC SUPPORT BONDED TO BOTH THE CIRCUIT AND SURROUNDING ENVELOPE

Filed Jan. 16, 1967

INVENTORS
HUBERT I. SCHRAGER
WILLIAM E. WATERS
BY Wm. Nolan
ATTORNEY 3,475,643
Patented Oct. 28, 1969

3,475,643

CERAMIC SUPPORTED SLOW WAVE CIRCUITS WITH THE CERAMIC SUPPORT BONDED TO BOTH THE CIRCUIT AND SURROUNDING ENVELOPE

Hubert I. Schrager, San Francisco, and William E. Waters, Sunnyvale, Calif., assignors to Varian Associates, Palo Alto, Calif., a corporation of California Filed Jan. 16, 1967, Ser. No. 609,523
Int. Cl. H01j *25/34*
U.S. Cl. 315—3.5 6 Claims

ABSTRACT OF THE DISCLOSURE

A ceramic support structure for slow wave circuits is bonded to the outer periphery of the slow wave circuit and to the barrel of the tube to provide a path of good thermal conduction from the slow wave circuit to the barrel which forms the envelope of the tube. The barrel is made of a material having a coefficient of linear thermal expansion approximately equal to that of the bonded ceramic support to prevent excessive deformation of the circuit and fracture of the ceramic support with thermal cycling. In a preferred embodiment, the ceramic is beryllia, and the barrel is made of porous tungsten infiltrated with copper or silver, the tungsten being about 65% by volume and the copper or silver being about 35% by volume.

Brief description of the prior art

Heretofore, slow wave circuits have been supported from a surrounding barrel structure via the intermediary of a plurality of ceramic support rods interposed between the outer periphery of the circuit and the inside surface of the barrel. The support rods were axially directed of the circuit and barrel structures. In order to increase the thermal conduction from the circuit to the barrel, the rods were inserted with the barrel distorted to a generally triangular cross sectional shape. After insertion of the rods, the distorting force was removed causing the barrel to spring back to its generally round condition, thereby producing a substantial compressive force on the ceramic supports and circuit to enhance thermal conduction from the circuit through the supports to the barrel structure. While such measures produced enhancements in the cooling of the circuit, it was desired to obtain even better conduction through the support structure.

Prior attempts to increase the thermal conduction through the support structure have included brazing the ceramic support rods to the circuit and to the barrel. However, in these prior attempts the ceramic was typically alumina and the circuit and surrounding barrel were of copper or molybdenum. After the brazes were made, it was found that the ceramic often fractured and that the circuit was distorted badly, thereby making the resultant circuit unuseable.

Brief summary of the invention

The principal object of the present invention is the provision of an improved microwave tube of the type using a ceramic supported slow wave circuit.

One feature of the present invention is the provision of a ceramic supported slow wave circuit for microwave tubes wherein the slow wave circuit is supported within a surrounding metallic barrel structure via the intermediary of a ceramic insulator and wherein the ceramic insulator is bonded to both the slow wave circuit and to the surrounding barrel structure. The barrel structure is made of a metal having a coefficient of linear thermal expansion at room temperature falling within the range of 7.5 to $10.0 \times 10^{-6}$/C.°, whereby the thermal expansion of the ceramic insulator is matched to that of the metal barrel to prevent excessive distortion of the slow wave circuit or fracture of the insulator assembly during thermal cycling of the tube.

Another feature of the present invention is the same as that of the preceding feature wherein the ceramic insulator is aluminum oxide or beryllium oxide and the barrel structure is made of a porous metal structure of a first metal having the pores infiltrated with a second metal having greater thermal conductivity than that of the first metal.

Another feature of the present invention is the same as that of any one or more of the preceding features wherein the barrel structure is made of a material having a porous tungsten structure infiltrated with copper or silver and wherein the tungsten comprises between 60 and 80% by volume and the copper or silver comprises between 20 and 40% by volume of the barrel material.

Other features and advantages of the present invention will become apparent upon a perusal of the following specification taken in connection with the accompanying drawings wherein:

Description of preferred embodiments

Figure 1:
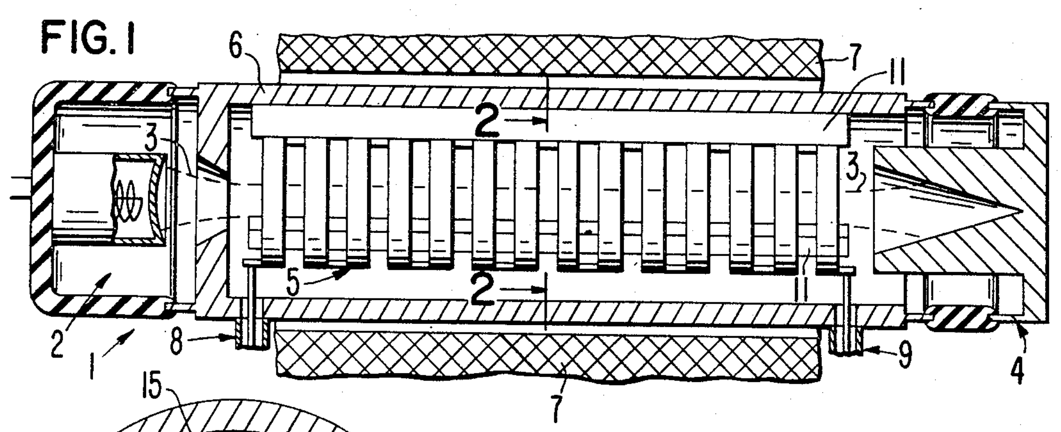
FIG. 1 is a longitudinal sectional view of a microwave tube incorporating features of the present invention.
Figure 2:
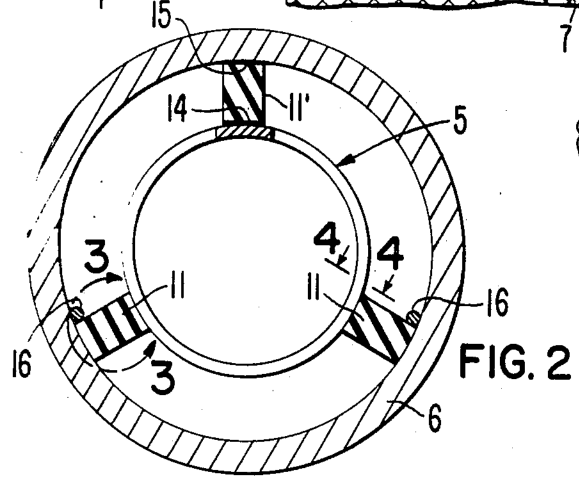
FIG. 2 is a sectional view of the structure of FIG. 1 taken along line 2—2 in the direction of the arrows.

Referring now to FIGS. 1 and 2, there is shown a microwave tube 1 incorporating features of the present invention. The tube 1 includes an electron gun assembly 2 at one end for forming and projecting a beam of electrons 3 over an elongated beam path to an electron beam collector structure 4 at the other end of the tube 1. A ring-and-bar slow wave circuit 5 is disposed along the beam path for electronic interaction with the beam 3. A metallic barrel structure 6 coaxially surrounds the ring-and-bar circuit 5 forming a central portion of the vacuum envelope of the tube. The ends of the barrel 6 are closed off at one end by the gun assembly 2 and at the other end by the beam collector structure 4. A solenoid 7 coaxially surrounds the barrel 6 for producing an axial magnetic field for focusing the beam 3 through the circuit 5. Signal wave energy to be amplified is applied to the slow wave circuit 5 via a coaxial line input coupler 8. The signal is amplified on the slow wave circuit 5 and extracted by an output coaxial line coupler 9.

Three ceramic insulative rods 11 are interposed between the outer periphery of the ring-and-bar circuit 5 and the inner surface of the surrounding barrel structure 6. The rods 11 extend the full axial length of the circuit 5 and are bonded, as by metallizing and brazing, to both the ring-and-bar circuit 5 and to the barrel structure 6. The rods 11 are disposed at 120° intervals about the periphery of the circuit 5.

The slow wave circuit 5 is made of a high melting point metal such as molybdenum. The ceramic rods 11 are made of a high temperature low loss tangent material such as alumina or beryllia, preferably beryllia due to its higher thermal conductivity. The barrel structure 6 is made of metal having approximately the same coefficient of linear thermal expansion, at room temperature, as that of the ceramic rods 11. Suitable barrel materials have a coefficient of linear thermal expansion at room temperature falling within the range of 7.5 to $10.0 \times 10^{-6}$/C.°. Examples of such metals include aggregate materials comprising a porous metal structure of a first metal such as tungsten having its pores infiltrated with a second metal of higher thermal conductivity such as copper or silver. Such aggregate materials made of tungsten and copper or tungsten and silver have the aforecited range of expansion coefficients when they comprise between 60 and 80% by volume of tungsten with between 20 and 40% by volume of silver or copper. A particularly suitable composition is 65% tungsten and 35% copper.

When the barrel 6 is employed with an external solenoid 7, as shown in FIG. 1, the barrel 6 is preferably made of a non-magnetic material. This rules out Kovar which is magnetic.

Figure 3:
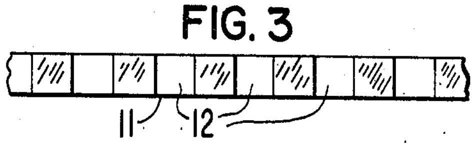
FIG. 3 is an enlarged plan view of a ceramic support rod portion of the structure of FIG. 2 delineated by line 3—3.
Figure 4:
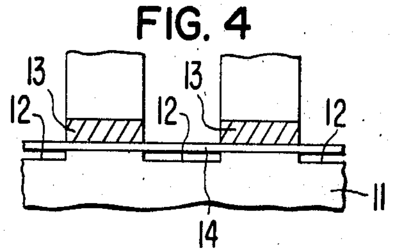
FIG. 4 is an enlarged fragmentary sectional view of the structure of FIG. 2 taken along line 4—4 in the direction of the arrows.

The ceramic rods 11 are brazed to the circuit 5 and to the barrel 6 by first completely metallizing the rods 11 by conventional techniques. The metallized rods 11 are then ground by a grinding wheel to remove the metallizing material from the sides which are not to be brazed. The side edge which is to be brazed to the slow wave circuit is ground with a pattern of transverse cuts 12 (see FIG. 3) to remove the metallizing layer only from the regions which are to be disposed inbetween adjacent rings 13 of the ring-end-bar circuit 5 (see FIG. 4). A thin strip of brazing alloy foil 14 such as gold foil 0.001" thick is then placed between the notched rod 11 and the outer periphery of the rings 13 of the slow wave circuit 5. The assembly is then jigged in the barrel structure 6 as shown in FIG. 2. A thin sheet of brazing alloy foil 15 is placed between the upper rod 11' and the barrel 6, whereas a 0.030" diameter brazing wire 16, such as copper-gold-silver alloy, is layed along the upper surface of the other two rods 11. Upon heating to brazing temperatures of approximately 1100° C. in a dry hydrogen atomsphere, the gold foil 14 melts and is drawn into the joint between the rod 11 and the rings 13. The melted brazing alloy does not wet the ceramic in the spaces between the rings 13. The brazing wires 16 also melt and the material is drawn into the joint between the barrel 6 and the rods 11. The resultant bonded joints provide good thermally conductive paths from the slow wave circuit 5 through the ceramic rods 11 to the barrel structure 6 where the heat can be removed by convection, radiation, and conduction.

In a typical example of a ceramic supported circuit 5, the rings 13 were of $M_0$ 0.020" thick and 0.240" in outside diameter. The rods 11 were 0.087" thick, 0.095" high and several inches long. The barrel 6 had a thickness of 0.175" and an inside diameter of 0.430". The rods 11 were of alumina and the barrel was of 65% tungsten and 35% copper. The tube 1 operated to 1.5 kw. output power.

Figures 5, 7:
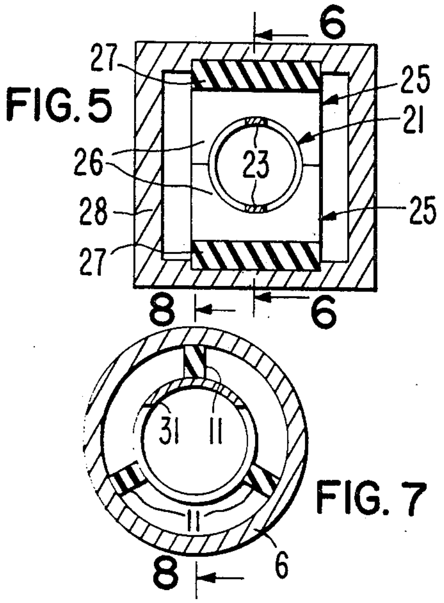
FIG. 5 is a transverse sectional view similar to that of FIG. 2 depicting an alternative slow wave circuit and support structure.
FIG. 7 is a transverse sectional view similar to those of FIGS. 2 and 5 depicting an alternative slow wave circuit and support structure.
Figure 6:
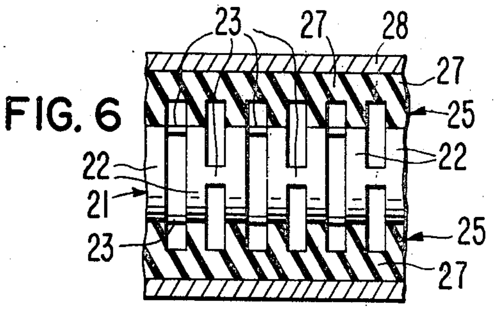
FIG. 6 is a sectional view of the structure of FIG. 5 taken along line 6—6 in the direction of the arrows.

Referring now to FIGS. 5 and 6, there is shown an alternative ceramic supported slow wave circuit. In this case, the slow wave circuit is a doubly connected ring-and-bar circuit 21. The circuit 21 comprises an array of coaxially aligned spaced apart rings 22 with each ring connected to the next at two diametrically opposed points by bars 23. The points of connection of the bars 23 rotates by 90° as the circuit advances from ring to ring.

A pair of ceramic comb structures 25 are put together around the circuit 21 and the tips of the finger portions 26 of the combs are bonded to the outer periphery of the rings 22 of the circuit 21. The spine portions 27 of the combs 25 are bonded to the inside wall of a surrounding barrel structure 28. As described previously with regard to the embodiments of FIGS. 1–4, the ceramic combs 25 and the barrel 20 are made of the materials as aforedescribed for the same reasons as aforecited.

Figure 8:
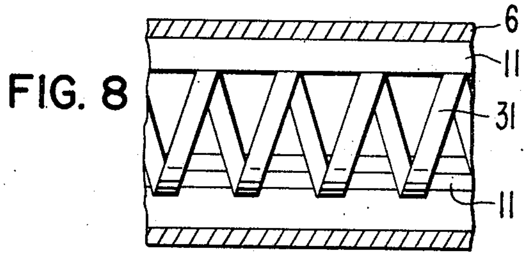
FIG. 8 is a sectional view of the structure of FIG. 7 taken along line 8—8 in the direction of the arrows.

Referring now to FIGS. 7 and 8, there is shown an alternative embodiment of the present invention. This structure is essentially the same as that of FIGS. 1–4 except that the slow wave circuit is a helical ribbon 31 as of $M_0$ which is bonded to its supporting ceramic rods 11 which rods 11 are in turn bonded to the barrel 6 as aforescribed with regard to FIGS. 1–4.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave tube apparatus including, means for forming and projecting a beam of electrons over an elongated predetermined beam path, means forming a beam collecting structure for collecting the beam, means disposed along the beam path forming a slow wave circuit for electronic interaction with the beam, means forming a metallic barrel structure surrounding said slow wave circuit, means forming a ceramic support structure interposed between said slow wave circuit and said surrounding barrel structure for supporting said slow wave circuit within and from said barrel structure, the improvement wherein said ceramic support structure is bonded to both said slow wave circuit and to said surrounding metallic barrel structure and wherein said barrel structure has an aggregate coefficient of linear thermal expansion at room temperature falling within the range of 7.5 to $10.0 \times 10^{-6}$/C.°, whereby said barrel and ceramic support structure have approximately equal expansion coefficients to prevent excessive deformation of said slow wave circuit and fracture of said ceramic support structure.

2. The apparatus of claim 1 wherein said ceramic support structure is made of a material selected from the class consisting of aluminum oxide and beryllium oxide.

3. The apparatus of claim 1 wherein said barrel structure is made of a material consisting of a porous metallic srtucture of a first metal having its pores infiltrated with a second metal of higher thermal conductivity than that of the first metal.

4. The apparatus of claim 3 wherein said first metal is tungsten and said second metal is selected from the class consisting of copper and silver.

5. The apparatus of claim 1 wherein said slow wave circuit is selected from the class consisting of helix, ring-and-bar, and doubly connected ring-and-bar structures.

6. The apparatus of claim 4 wherein said infiltrated porous metal structure is between 60 and 80% by volume of tungsten and between 20 and 40% by volume of said second metal.

References Cited

UNITED STATES PATENTS

| | | | |
|---|---|---|---|
| 2,790,926 | 4/1957 | Morton | 315—3.5 |
| 3,271,615 | 9/1966 | Washburn | 315—3.5 |

HERMAN KARL SAALBACH, Primary Examiner

SAXFIELD CHATMON, JR., Assistant Examiner

U.S. Cl. X.R.

315—37.3